(12) United States Patent  (10) Patent No.: US 8,768,756 B2
Smith  (45) Date of Patent: Jul. 1, 2014

(54) SYSTEM AND METHOD OF DELIVERING AUDIO COMMUNICATIONS

(75) Inventor: Charles Eric Smith, Austin, TX (US)

(73) Assignee: Unwired Nation, Inc., Austin, TX (US)

( * ) Notice: Subject to any disclaimer, the term of this patent is extended or adjusted under 35 U.S.C. 154(b) by 1740 days.

(21) Appl. No.: 11/932,758

(22) Filed: Oct. 31, 2007

(65) Prior Publication Data

US 2009/0037276 A1 Feb. 5, 2009

Related U.S. Application Data

(60) Provisional application No. 60/953,372, filed on Aug. 1, 2007.

(51) Int. Cl.
*G06Q 30/00* (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | | |
|---|---|---|---|
| 6,510,417 B1 | 1/2003 | Woods et al. | |
| 6,658,093 B1 | 12/2003 | Langseth et al. | |
| 6,768,788 B1 | 7/2004 | Langseth et al. | |
| 6,901,430 B1 | 5/2005 | Smith | |
| 6,934,684 B2 | 8/2005 | Alpdemir et al. | |
| 2002/0023038 A1 | 2/2002 | Fritsch et al. | |
| 2002/0062276 A1 | 5/2002 | Krueger et al. | |
| 2002/0065885 A1 | 5/2002 | Buonanno et al. | |
| 2002/0073034 A1 | 6/2002 | Wagner et al. | |
| 2002/0073158 A1 | 6/2002 | Dalal et al. | |
| 2002/0099776 A1 | 7/2002 | Cafarella et al. | |
| 2003/0028380 A1* | 2/2003 | Freeland et al. | 704/260 |
| 2003/0154120 A1 | 8/2003 | Freishtat et al. | |
| 2004/0006478 A1 | 1/2004 | Alpdemir et al. | |
| 2004/0043770 A1 | 3/2004 | Amit et al. | |
| 2004/0148638 A1 | 7/2004 | Weisman et al. | |
| 2004/0172454 A1 | 9/2004 | Appelman et al. | |
| 2004/0254853 A1 | 12/2004 | Heene et al. | |
| 2005/0004984 A1 | 1/2005 | Simpson | |
| 2005/0021387 A1 | 1/2005 | Gottfurcht | |
| 2005/0080712 A1 | 4/2005 | Bauer et al. | |
| 2005/0097000 A1 | 5/2005 | Freishtat et al. | |
| 2005/0136949 A1 | 6/2005 | Barnes, Jr. | |
| 2005/0202781 A1 | 9/2005 | Steelberg et al. | |
| 2007/0100650 A1* | 5/2007 | Ramer et al. | 705/1 |
| 2007/0165823 A1* | 7/2007 | Haldeman et al. | 379/218.01 |
| 2008/0172291 A1* | 7/2008 | Hurowitz et al. | 705/14 |

FOREIGN PATENT DOCUMENTS

| | | |
|---|---|---|
| EP | 1 041 502 A2 | 10/2000 |
| EP | 1 096 409 A1 | 5/2001 |
| WO | WO 00/19691 A1 | 4/2000 |
| WO | WO 00/22906 A2 | 4/2000 |
| WO | WO 00/25231 A1 | 5/2000 |
| WO | WO 01/26393 A1 | 4/2001 |

(Continued)

*Primary Examiner* — Alvin L Brown (74) *Attorney, Agent, or Firm* — Toler Law Group, PC (57) ABSTRACT

A method of delivering an audio communication is disclosed and includes selectively delivering an audio message including a content portion and an advertising portion to a voice communication device. The audio message has a first available delivery format for live communication with a user of the voice communication device and a second available delivery format for communication with a voice mail system associated with the voice communication device.

44 Claims, 9 Drawing Sheets

(56) References Cited

FOREIGN PATENT DOCUMENTS

| WO | WO 01/50729 | A1 | 7/2001 |
| WO | WO 01/80133 | A2 | 10/2001 |
| WO | WO 01/98983 | A1 | 12/2001 |
| WO | WO 02/095526 | A2 | 11/2002 |
| WO | WO 03/063036 | A1 | 7/2003 |
| WO | WO 03/065149 | A2 | 8/2003 |
| WO | WO 03/073217 | A2 | 9/2003 |
| WO | WO 2005/076180 | A1 | 8/2005 |
| WO | WO 2005/106754 | A2 | 11/2005 |

* cited by examiner

SYSTEM AND METHOD OF DELIVERING AUDIO COMMUNICATIONS

CROSS-REFERENCE TO RELATED APPLICATION(S)

This application claims priority from U.S. Provisional Patent Application No. 60/953,372, filed on Aug. 1, 2007, and entitled "SYSTEM AND METHOD OF DELIVERING AUDIO COMMUNICATIONS", which is hereby incorporated by reference.

FIELD OF THE DISCLOSURE

The present disclosure is generally related to computer networks and to delivering audio communications.

BACKGROUND

As of May 2005, the Cellular Telecommunications Industry Association (CTIA) estimated that there were 182 million wireless subscribers in the United States. Further, the CTIA estimates that over 2.5 billion text messages are sent every month. Internet companies often use text messages to deliver notifications to mobile telephones via short messaging service (SMS). Typically, however, text messaging is not secure, does not provide guaranteed delivery, is not free, and is not sent in real-time.

In addition, text messaging is not a very efficient way for many content providers to interact with subscribers, because content may change rapidly. Nonetheless, audio communication may present certain challenges to content providers. For example, many content providers utilize instant feedback to gauge the usability of their systems, the desirability of their content, and other aspects of their content services. Additionally, if a call is routed to voice mail, content and interactive options that are intended for a live call may never reach a subscriber. Accordingly, there is a need for an improved system and method of communicating audio communications.

DETAILED DESCRIPTION OF THE DRAWINGS

Figure 1:
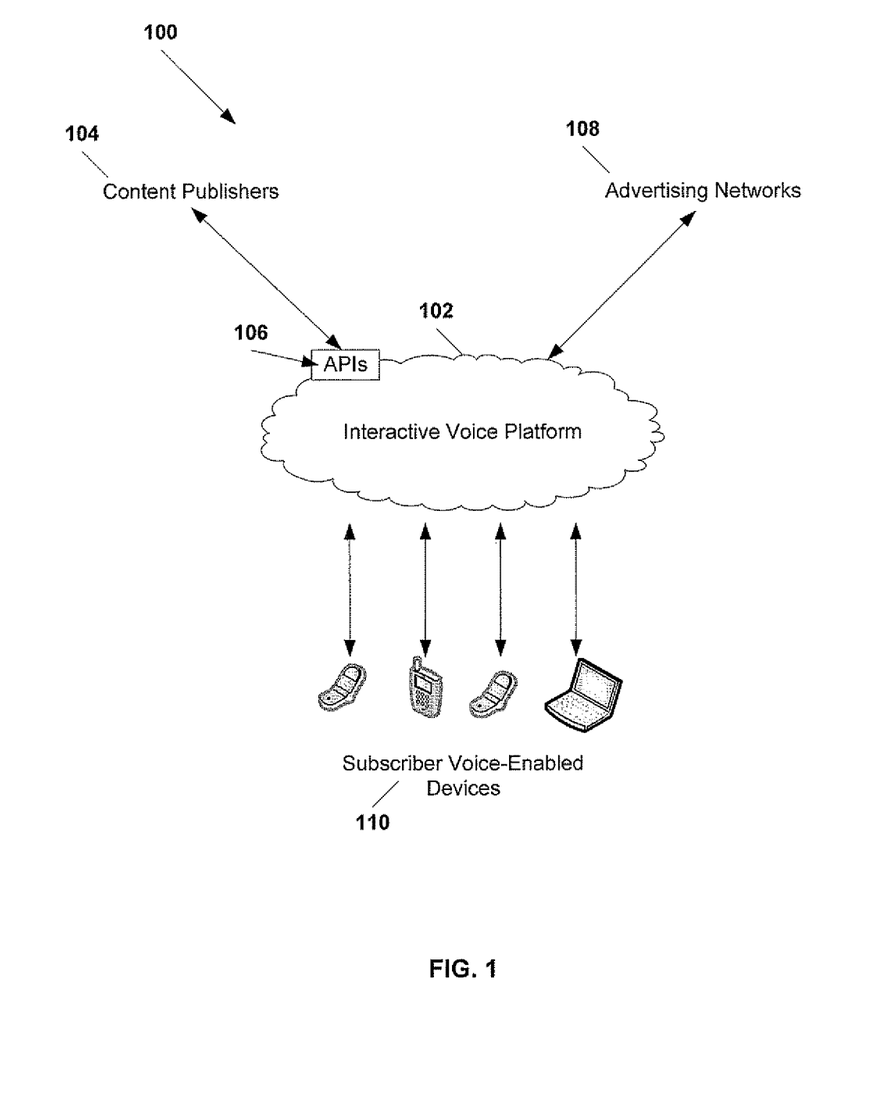
FIG. 1 is a block diagram of a particular embodiment of a system to deliver audio communications.

Referring to FIG. 1, a particular embodiment of a system to deliver audio communications is illustrated and designated generally 100. The system 100 includes an interactive voice platform 102 that communicates with a plurality of content publishers 104. The content publishers 104 can include e-commerce providers, financial service providers, governmental entities, social network providers, entertainment content providers, news providers, weblog providers, other content publishers, or any combination thereof. In an illustrative embodiment, each of the content publishers 104 can communicate with the interactive voice platform 102 via one of a plurality of application programming interfaces 106.

Further, the interactive voice platform 102 communicates with a plurality of advertising networks 108. The advertising networks 108 can include various vendor systems. In addition, the interactive voice platform 102 communicates with a plurality of subscriber voice-enabled devices 110. The plurality of subscriber voice-enabled devices 110 can include, for example, one or more cellular phones, one or more smart phones, one or more personal data assistant (PDA) phones, one or more voice-enabled computers, one or more other voice-enabled devices, or any combination thereof.

In a particular, illustrative embodiment, the interactive voice platform 102 receives content from various content publishers 104 via a plurality of application programming interfaces (APIs) 106 associated with a content portal communicating with the interactive voice platform 102. The interactive voice platform 102 can also receive from the content publishers 104 user data, rules for including the content in audio messages, and selectable options to include with content. In addition, the interactive voice platform 102 receives advertising content from the advertising networks 108.

The interactive voice platform 102 can select content to include with an audio message to a subscriber. The content can include e-commerce content (including, but not limited to, online auction content), offline auction content, financial content, government content, social networking content, entertainment content (including, but not limited to, sports content, movie content, showtime content, celebrity content, or any combination thereof), news content, weblog content, or any combination thereof. Further, content may include personal communications, account status information (e.g., regarding accounts with one or more content providers, advertisers, administrators of the interactive voice platform, or subscriber device service providers), messaging information, or any combination thereof.

The interactive voice platform 102 can select the content based on user data and notification rules received from the content publisher 104. The interactive voice platform identifies an advertising capacity related to the content, such as a number of advertisements that can be included with the audio message, such that the audio message does not exceed a certain amount of time. The interactive voice platform 102 integrates the advertisement(s) with the selected content.

In a particular embodiment, the interactive voice platform 102 can place a call to the subscriber for whom the content is intended. The interactive voice platform 102 can also place additional calls having substantially identical content and advertisements to additional subscribers. The interactive voice platform 102 can detect whether the call is answered at the subscriber device or is routed to voice mail, and the interactive voice platform 102 selects one of a plurality of formats for the audio message based on its detection of a live call or voice mail. For example, when the call is routed to voice mail, the interactive voice platform 102 selects a voice mail delivery format. Whereas, when the call is answered, the interactive voice platform 102 selects a voice mail delivery format for the audio message.

When the interactive voice platform 102 selects the voice mail delivery format, the interactive voice platform 102 records the audio message, which includes at least the selected content and advertisement(s). The content can include a content heading, a content summary, detailed content, or any combination thereof. The interactive voice platform 102 can also record selectable options provided by the content publisher. The options may include, for example, a call re-triggering option, a live lead transfer option, a forwarding option, other options, or any combination thereof Selectable options can include voice-activated options, digital tone multiplex frequency (DTMF) activated options, or any combination thereof.

The subscriber can retrieve the voice mail audio message by using a voice-enabled subscriber device 110 to call a voice mail system. The subscriber device 110 receives the audio message recorded by the interactive voice system 102. In one embodiment, the subscriber device 110 outputs the advertising portion associated with the audio message and then outputs the content portion associated with the audio message. Additionally, the subscriber device 110 can output publisher selectable options. The subscriber can re-trigger the call placed by the interactive voice platform 102 by selecting a re-trigger option. The subscriber device can send a call re-triggering signal to the interactive voice platform 102, such as a phone call, a text message, or other signal. The subscriber device 110 can then receive a live call providing the audio message in a live call delivery format.

Figure 3:
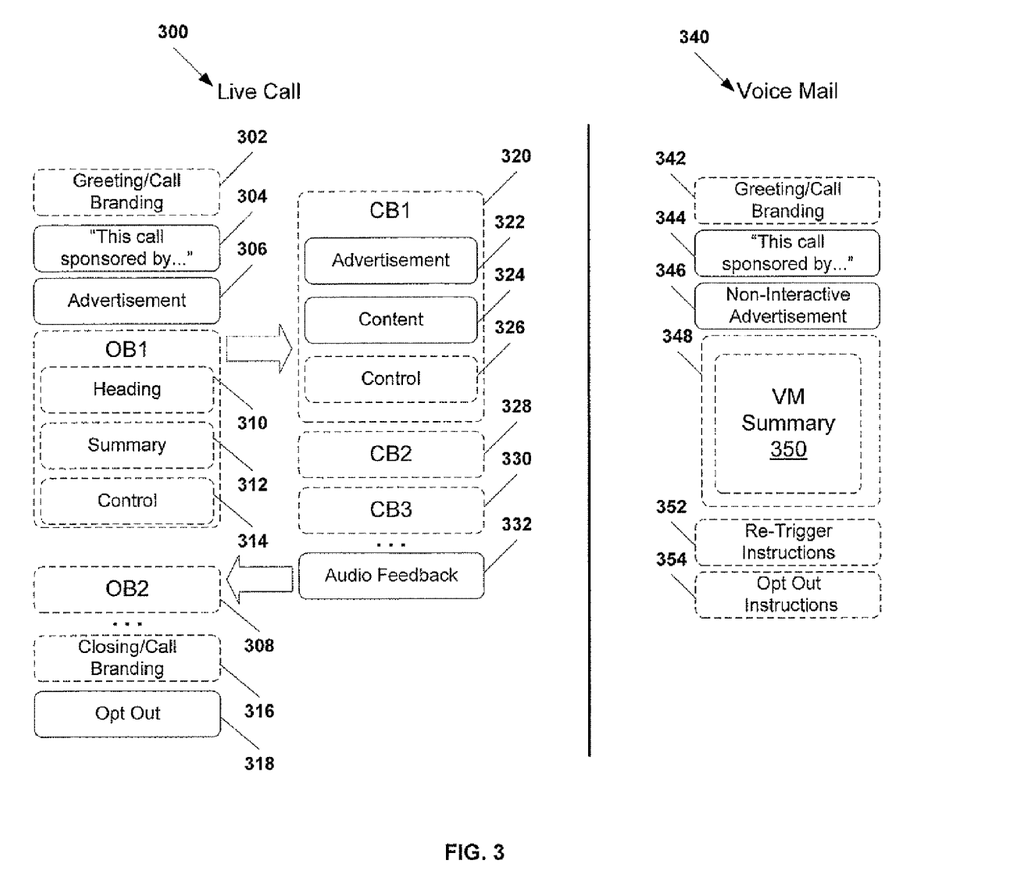
FIG. 3 is a block diagram of particular embodiments of formats to deliver audio communications.
Figure 4:
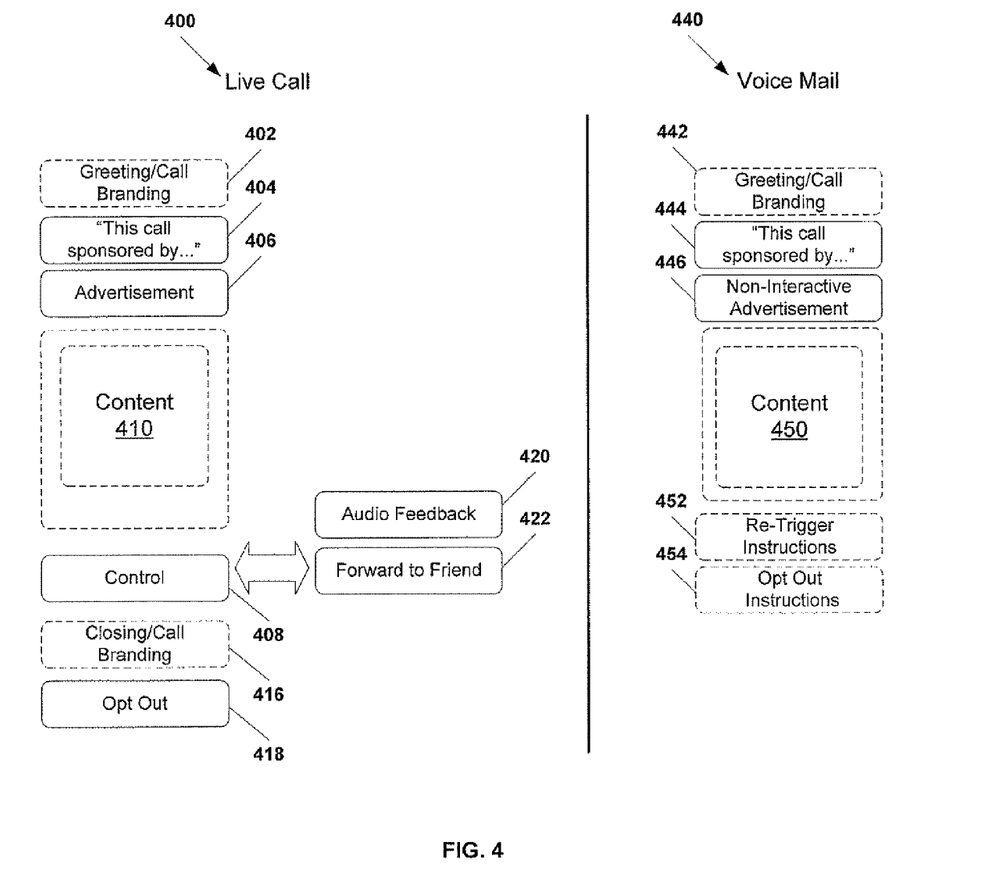
FIG. 4 is a block diagram of additional particular embodiments of formats to deliver audio communications.

When the interactive voice platform 102 selects a live call delivery format for an audio message, the interactive voice platform 102 can send an introduction and advertisement to the subscriber device 110. The content of the audio message can then be sent to the subscriber device 110. In a particular embodiment, the subscriber can select an option to receive additional content, such as additional levels of detail with respect to hierarchical content or additional portions of non-hierarchical content. Examples of hierarchical and non-hierarchical content are illustrated in FIGS. 3-4. If additional content is selected, the interactive voice platform 102 can send the additional content to the subscriber device 110. Otherwise, the interactive voice platform 102 sends selectable options to the subscriber device 110. Selectable options can include voice-selectable options (e.g., interactive voice response (IVR) selectable options), DTMF selectable options, or any combination thereof.

Selectable options can include, for example, a selectable option to submit feedback via a website associated with the publisher of the content received with the audio message. If the interactive voice platform 102 receives a selection of a feedback option, the interactive voice platform 102 can connect the subscriber device with the website of the publisher, and the feedback can be formatted and posted at the website. In an illustrative embodiment, the audio feedback can be converted to text posted at the website. Alternatively, the audio feedback can be posted as a selectable audio file. In another example, the audio feedback can be streamed in near real time to listeners via the website.

Other selectable options include a live lead transfer option or a forwarding option. If the interactive voice platform 102 receives a selection of a live lead transfer option, the interactive voice platform 102 can connect the call with a customer service representative. Alternatively, the interactive voice platform 102 can notify the content publisher 104 of the selection, and the publisher can instruct a customer service representative to call the subscriber. If a forwarding option is selected, the interactive voice platform 102 can place a call having a substantially identical audio message to another subscriber or another contact of the subscriber receiving the original call.

In a particular embodiment, the interactive voice platform 102 can include an opt-out option with a call. If the subscriber selects the opt-out command, the interactive voice platform 102 can remove a subscriber account at the interactive voice platform, such that the subscriber receives no further calls. Alternatively, the interactive voice platform can send an instruction to the provider of the content provided with the call to remove an account related to the subscriber, such that the subscriber receives no further calls having content of the particular publisher.

Figure 2:
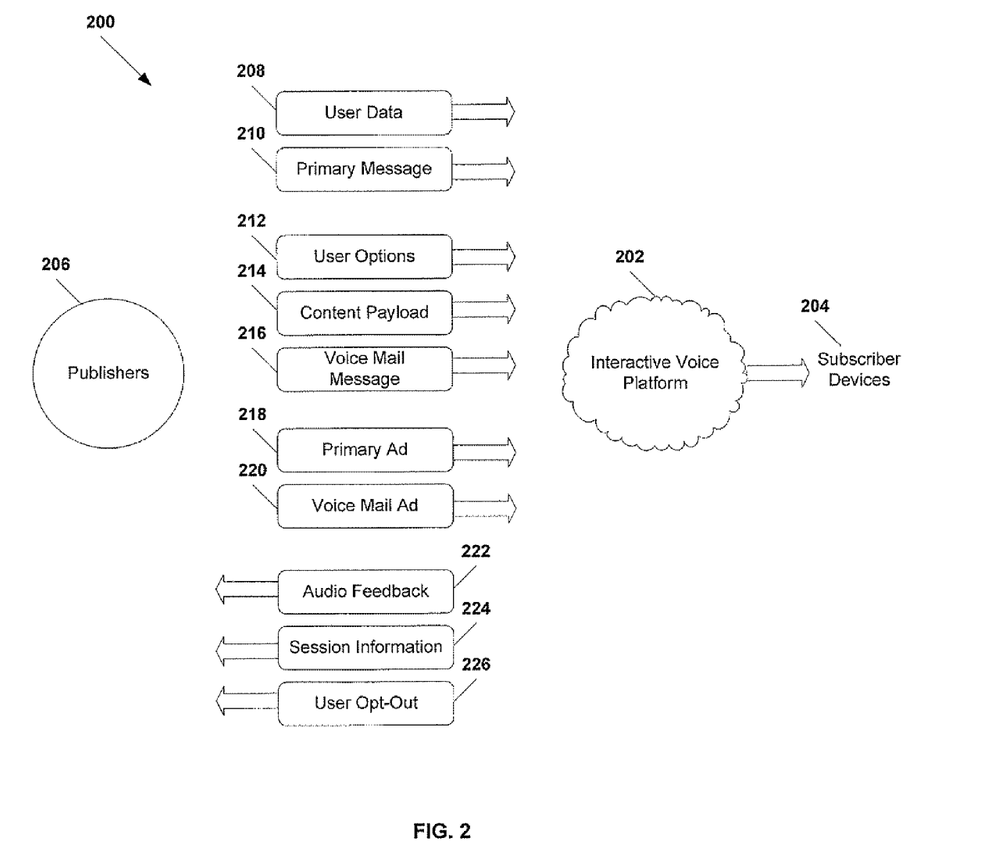
FIG. 2 is a block diagram of a second particular embodiment of a system to deliver audio communications.

Referring to FIG. 2, a second particular embodiment of a system to deliver audio communications is illustrated and designated generally 200. The system 200 includes an interactive voice platform 202 communicating with a plurality of subscriber devices 204. The interactive voice platform 202 also communicates with a plurality of publishers 206, which may include content publishers and advertising publishers.

In a particular embodiment, a content publisher sends user data 208 and one or more primary messages 210, such as an introductory message or branding message related to the content publisher, to the interactive voice platform 202. In addition, the content publisher 206 sends selectable interactive options 212, a content payload 214, and a voice mail message 216 related to the content payload 214, to the interactive voice platform 202. Moreover, an advertising publisher sends a primary advertisement 218 and a voice mail advertisement 220 to the interactive voice platform 202.

In a particular embodiment, the subscriber devices 204 can send audio feedback 222 to the publishers 206 via the interactive voice platform 202. Further, the subscriber devices 204 can send session information 224 to the publishers 206 via the interactive voice platform 202. In an illustrative embodiment, the subscriber devices 204 can send user opt-out information 226 to the publishers 206 via the interactive voice platform 202. For instance, if an opt-out selection is made via a subscriber device 204, a signal corresponding to the selection can be sent to a corresponding publisher 206, such that no further messages are sent from the publisher 206 to the subscriber device 204.

Referring to FIG. 3, particular embodiments of formats to deliver audio communications are illustrated. A call placed to a subscriber device from an interactive voice platform can include an audio message having a content portion and an advertising portion. The interactive voice platform can select a live format 300 for the audio message after detecting a live call with a subscriber. Whereas, the interactive voice platform can select a voice mail format 340 for the audio message after detecting that the call has been routed to a voice mail system.

In an illustrative embodiment, the live call format 300 can include a greeting or call branding portion 302. Further the live call format 300 can include an indication of sponsorship 304 that identifies an advertiser associated with an advertisement 306 that is included in the live call format 300. The advertisement 306 can include a recorded advertisement that is played to a subscriber prior to content being communicated to the subscriber device. In another embodiment, the advertisement 306 can include a text portion or a video portion sent to the subscriber device prior to the content.

In a particular embodiment, the content portion of the audio message can include hierarchical content having one or more overview portions 308. Each overview portion 308 can include a heading 310, such as a news headline, blog title, or other subject indication. The overview portion 308 can also include a summary 312 of the content, such as a synopsis or incomplete portion of the content. Further, the overview portion 308 can include a control 314, such as an interactive option, that is selectable to receive one or more detailed versions 320, 328, 330 of the content. In an illustrative, non-limiting embodiment, the detailed version 320 of the content may include one or more additional advertisements 322 that are communicated to the subscriber device prior to the detailed content 324.

The detailed version 320 can also include one or more controls 326 to select user options, such as controls to connect with a customer service representative to purchase a good or service. The controls 326 can also include an option to communicate audio feedback 332 back to the content publisher. For instance, a selection of the audio feedback control can connect the subscriber with a publisher website. The subscriber can speak audio feedback 332 into a subscriber device, and the audio feedback 332 can be provided via a website forum as a selectable audio file or as text converted from speech. Alternatively, the audio feedback 332 can be provided as live audio content, such as via Internet radio or other live Internet broadcast.

The live call format 300 can also include a closing portion 316, which may include the call branding portion related to the content publisher. The live call format 300 can also include an opt-out option 318 that is selectable to receive no further calls from the content publisher.

In an illustrative embodiment, the voice mail format 340 can include a voice mail greeting or call branding portion 342. Further the voice mail format 340 can include an indication of sponsorship 344 that identifies an advertiser associated with a non-interactive voice mail advertisement 346 that is included in the voice mail format 340. The non-interactive voice mail advertisement 346 can include a recorded advertisement that is played to a subscriber prior to voice mail content, such as the voice mail content summary 350, being communicated to the subscriber device.

The voice mail format 340 can also include one or more interactive controls to select user options. In one embodiment, the interactive controls can include instructions 352 to re-trigger a call, such that the subscriber can interact with the live call format 300 of the audio message. The controls can also include opt-out instructions 354 that are selectable or executable to receive no further calls from the content publisher.

In an illustrative, non-limiting embodiment, each aspect of a call can be associated with a target amount of time. For example, greeting/call branding portions 302, 342 and closing/call branding portions 316 can be less than five seconds long. Further, each advertisement 306, 322, 346 can be less than ten seconds long. Each summary content object 308 can be less than twenty seconds long, including heading 310, summary 312, and control options 314. Detailed content portions 324 can be less than two minutes long, and detailed content objects 320 can be less than two minutes fifteen seconds long, including additional advertisements 322 and control options 326. Additionally, audio feedback 332 can be limited to three minutes or another time suitable for posting feedback via a publisher website. An opt-out option 318 can be less than five seconds long.

In another illustrative embodiment, content associated with a voice mail delivery format can be longer than content summaries associated with the live format delivery format, because multiple levels of content detail might not be available via voice mail. For example, a content summary 350 can be less than thirty seconds, whereas the summary 312 associated with the live call delivery format may be less than ten seconds. Re-triggering instructions 352 and opt-out instructions 354 can each be less than ten seconds.

Referring to FIG. 4 additional particular embodiments of formats to deliver audio communications are illustrated. A call placed to a subscriber device from an interactive voice platform can include an audio message having a content portion and an advertising portion. The interactive voice platform can select a live format 400 for the audio message after detecting a live call with a subscriber. Whereas, the interactive voice platform can select a voice mail format 440 for the audio message after detecting that the call has been routed to a voice mail system.

In an illustrative embodiment, the live call format 400 can include a greeting or call branding portion 402. Further the live call format 400 can include an indication of sponsorship 404 that identifies an advertiser associated with an advertisement 406 that is included in the live call format 400. The advertisement 406 can include text, video, recorded audio, or any combination thereof, sent to the subscriber device prior to the content.

In a particular embodiment, the content portion of the audio message can include non-hierarchical content 410. Further, the live call format 400 of the audio message can include one or more controls 408, each of which is selectable to execute or cause the execution of a selectable option. For example, the control(s) 408 can include an option to communicate audio feedback 420 back to the content publisher. For instance, a selection of the audio feedback control can connect the subscriber with a publisher website. The subscriber can speak audio feedback 420 into a subscriber device, and the audio feedback 420 can be provided via a website forum as a selectable audio file or as text converted from speech. Alternatively, the audio feedback 420 can be provided as live audio content, such as via Internet radio or other live Internet broadcast.

In another example, the control(s) 408 can include a forwarding 422 option that is selectable to cause the interactive voice system to forward one or more portions of the audio message to another subscriber or to another contact of the subscriber currently receiving the audio message via the live call format 400.

The live call format 400 can also include a closing portion 416, which may include the call branding portion related to the content publisher. The live call format 400 can also include an opt-out option 418 that is selectable to receive no further calls from the content publisher.

In an illustrative embodiment, the voice mail format 440 can include a voice mail greeting or call branding portion 442. Further the voice mail format 440 can include an indication of sponsorship 444 that identifies an advertiser associated with a non-interactive voice mail advertisement 446 that is included in the voice mail format 440. The non-interactive voice mail advertisement 446 can include a recorded advertisement that is played to a subscriber prior to voice mail content, such as the voice mail content 450, being communicated to the subscriber device. In one embodiment, the voice mail content 450 can be substantially identical to the live call content 410. In another embodiment, the voice mail content 450 can include aspects that reflect that the voice mail content 450 is not being delivered via the live call format 400.

The voice mail format 440 can also include one or more interactive controls to select user options. In one embodiment, the interactive controls can include instructions 452 to re-trigger a call, such that the subscriber can interact with the live call format 400 of the audio message. The controls can also include opt-out instructions 454 that are selectable or executable to receive no further calls from the content publisher.

In an illustrative, non-limiting embodiment, each aspect of a call can be associated with a target amount of time. For example, greeting/call branding portions 402, 442 and closing/call branding portions 416 can be less than five seconds long. Further, each advertisement 406, 446 can be less than ten seconds long. Each content object 410, 450 can be less than two minutes long. Additionally, audio feedback 432 can be limited to three minutes or another time suitable for posting feedback via a publisher website. Forwarding options/instructions can be less than thirty seconds long. An opt-out option 418 can be less than five seconds long. Re-triggering instructions 452 and opt-out instructions 454 can each be less than ten seconds.

Figure 5:
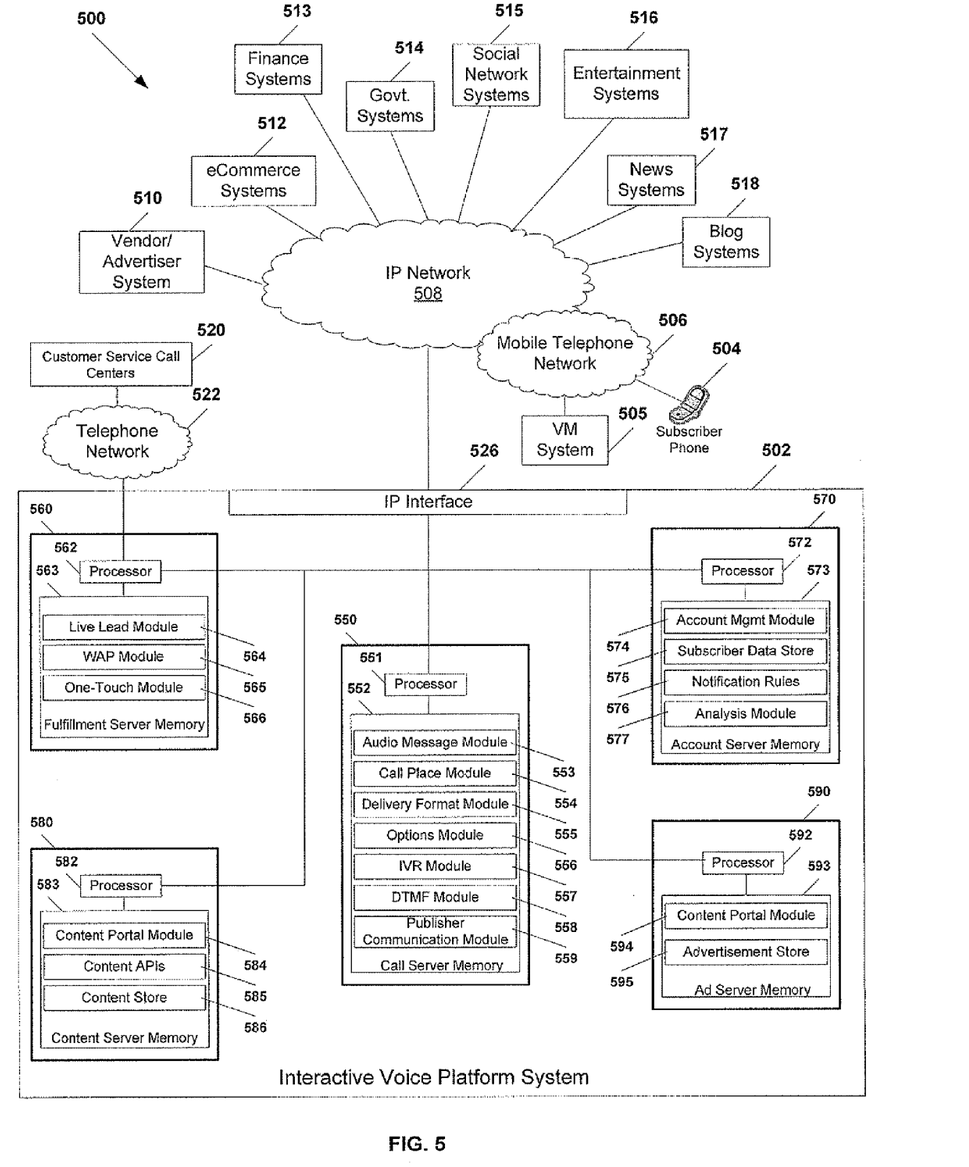
FIG. 5 is a block diagram of a third particular embodiment of a system to deliver audio communications.

Referring to FIG. 5, a third particular embodiment of a system to deliver audio communications is illustrated and designated generally 500. The system 500 includes an interactive voice platform system 502 adapted to communicate with a plurality of remote systems via an Internet protocol (IP) network 508. Such remote systems can include content publisher systems, such as electronic commerce systems 512, financial systems 513, government systems 514, social network systems 515, entertainment systems 516, news systems 517, weblog systems 518, or any combination thereof. The remote systems can also include advertiser or vendor systems 510.

The interactive voice platform system 502 is also adapted to communicate with a plurality of subscriber voice-enabled devices, such as the subscriber mobile phone 504, and with at least one voice mail system 505 via at least one mobile phone network 506, such as a global system for mobile communication (GSM) network. In a particular embodiment, the interactive voice platform system 502 can be adapted to communicate with a provider of a service to the subscriber device 504, such as a cellular provider associated with the mobile phone network 506. Additionally, the interactive voice platform system 502 can be adapted to communicate with a plurality of customer service call centers 520 via a telephone network 522, such as a public switched telephone network (PSTN).

In a particular embodiment, the interactive voice platform system 502 can include a plurality of servers 550, 560, 570, 580, 590 that communicate with each other. One or more of the plurality of servers 550, 560, 570, 580, 590 can also communicate with an IP interface 526 that is adapted to facilitate communication between the interactive voice platform system 502 and the IP network 508. Each of the servers 550, 560, 570, 580, 590 includes processing logic and memory accessible to the processing logic. Further, any number or combination of the modules described above can be stored and executed within a single processing element or multiple processing elements in communication with each other. In alternative embodiments, each of the servers 550, 560, 570, 580, 590 can be a processing element that is a server, as described, or a process performed by one or more network entities or components of the interactive voice platform system 502.

For instance, the interactive voice platform system 502 can include a call server 550 that includes processing logic 551 and memory 552 accessible to the processing logic 551. The call server memory 552 can include an audio message module 553 that is executable by the processing logic 551 to select and integrate content and advertisements to produce audio messages. The audio message module 553 can select content and advertisements according to rules or guidelines received from content publishers and advertisers, according to rules associated with a user account, or a combination thereof. In addition, the call server memory 552 can include a call place module 554 that is executable by the processing logic 551 to place calls to subscriber phones 504, where the calls include audio messages having content and at least one advertisement. Calls can be placed according to rules received from content publishers, according to rules associated with user accounts, according to call placement rules maintained by the interactive voice platform system 502, in response to selections of call re-trigger options, in response to selections of forward-to-friend options, or any combination thereof.

Further, the call server memory 552 can include a delivery format module 555 that is executable by the processing logic 551 to select a delivery format for the audio message by determining whether a call is answered or routed to voice mail. Examples of delivery formats are illustrated in FIGS. 3-4. The call server memory 552 can also include an options module 556 that is executable by the processing logic 551 to select interactive options related to an audio message based on the delivery format and to communicate such options to the subscriber phone 504 or to a voice mail system 505. Such options can include a live lead transfer option, an audio feedback option, an opt-out option, a caller-trigger option, a forward-to-friend option, a one-touch purchase option, or any combination thereof.

In an illustrative embodiment, the call server memory 552 can include an interactive voice response (IVR) module 557 and a digital tone multiplex frequency (DTMF) module 558 that are executable by the processing logic 551 to receive and process user selections of interactive options presented with an audio message. Additionally, the call server memory 552 can include a publisher communication module 559 that is executable by the processing logic 551 to communicate user selections of interactive options to a publisher associated with content included in an audio message. For example, the publisher communication module 559 can be executable by the processing logic 551 to connect a subscriber phone 504 with a publisher website in response to a selection of an audio feedback option. In another example, the publisher communication module 559 can be executable by the processing logic 551 to notify a publisher of a selection of an opt-out option by a subscriber.

In a particular embodiment, the interactive voice platform system 502 can include a fulfillment server 560 that includes processing logic 562 and memory 563 accessible to the processing logic 562. The memory 563 can include a live lead module 564 that is executable by the processing logic 562 to connect a subscriber phone 504 with one of a plurality of customer service call centers 520 in response to a selection of a live lead option. The memory 563 can also include a wireless access protocol (WAP) module 565 that is executable by the processing logic 562 to send text or other data to a subscriber phone 504 in connection with advertising, content, or a purchase of a product or service. In an illustrative embodiment, the memory 563 can include a one-touch module 566 that is executable by the processing logic 562 to send an order for a product or service to a customer call service center or publisher or advertiser system in response to a selection of a one-touch option at a subscriber phone 504.

In a particular embodiment, the interactive voice platform system 502 can include an account server 570 that includes processing logic 572 and memory 573 accessible to the processing logic 572. The memory 573 can include an account management module 574 that is executable by the processing logic 572 to create, delete, and modify accounts of subscribers receiving content via the interactive voice platform system 502. The memory 573 can include a subscriber data store 575 that is adapted to store contact data, preferences, content subscriptions, and other account information related to subscribers. Further, the memory 573 can include a notification rules module 576 that is adapted to store call placement rules designated by subscribers and that is accessible to the call server 550. In an illustrative embodiment, the memory 573 can include an analysis module 577 that is executable by the processing logic 572 to track user selections and behavior with respect to content, advertisements, or a combination thereof. The analysis module 577 may also be executable by the processing logic 572 to predict subscriber preferences and behavior.

In a particular embodiment, the interactive voice platform system 502 can include a content server 580 that includes processing logic 582 and memory 583 accessible to the processing logic 582. The memory 583 includes a content portal module 584 that is executable by the processing logic 582 to provide a communications portal for content publisher systems 512-518 and to receive content, content selection rules, content notification rules, publisher selectable options, or any combination thereof, from the content publisher systems 512-518. In an illustrative embodiment, the publisher systems 512-518 can communicate with the portal via a plurality of content application programming interfaces (APIs) 585. The memory 583 also includes a content store 586 adapted to store content, content selection rules, content notification rules, publisher selectable options, or any combination thereof, received from the content publisher systems 512-518.

In a particular embodiment, the interactive voice platform system 502 can include an ad server 590 that includes processing logic 592 and memory 593 accessible to the processing logic 592. The memory 593 includes an ad portal module 594 that is executable by the processing logic 592 to provide a communications portal for advertiser or vendor systems 510 and to receive advertisements, ad selection rules, advertiser fulfillment options, or any combination thereof, from the advertiser or vendor systems 510. The memory 593 also includes an advertisement store 595 adapted to store advertisements, ad selection rules, advertiser fulfillment options, or any combination thereof, received from the advertiser or vendor systems 510.

Figure 6:
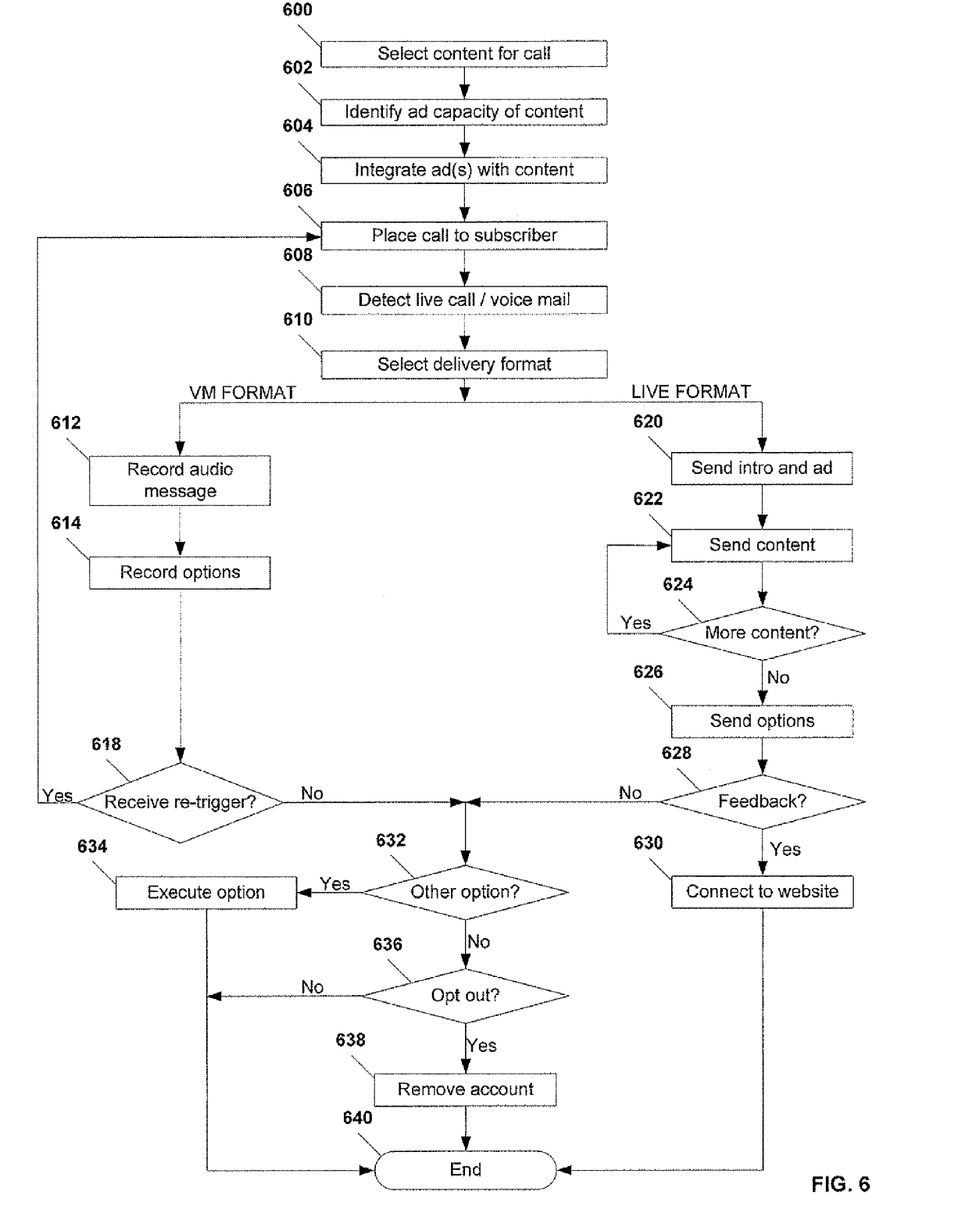
FIG. 6 is a flow diagram of a particular embodiment of a method of delivering audio communications.

Referring to FIG. 6, a particular embodiment of a method of delivering audio communications is illustrated. At block 600, an interactive voice system selects content to include with an audio message to a subscriber. The interactive voice platform can select the content based on user data and notification rules received from a publisher of the content via an application programming interface of the interactive voice platform. Moving to block 602, the interactive voice platform identifies an advertising capacity related to the content. In an illustrative embodiment, the advertising capacity can indicate a number of advertisements that can be included with the audio message, such that the audio message does not exceed a certain amount of time. Proceeding to block 604, the interactive voice platform integrates the advertisement(s) with the selected content.

Continuing to block 606, the interactive voice platform places a call to the subscriber for whom the content is intended. The interactive voice platform can also place additional calls having substantially identical content and advertisements to additional subscribers. Advancing to block 608, the interactive voice platform detects whether the call is answered at the subscriber device or routed to voice mail. Further, at block 610, the interactive voice platform selects a delivery format for the audio message based on its detection of a live call or voice mail.

When the interactive voice platform selects the voice mail delivery format, the method moves to block 612, and the interactive voice platform records the audio message, which includes at least the selected content and advertisement(s). The content can include a content heading, content summary, detailed content, or any combination thereof. Proceeding to block 614, the interactive voice platform records selectable options provided by the content publisher. The options may include, for example, a call re-triggering option, a live lead transfer option, other options, or any combination thereof.

Continuing to decision node 618, the interactive voice platform determines whether it has received a signal from a subscriber device indicating a selection of a call re-triggering option included with the voice mail. If the interactive voice platform has received a signal indicating a selection of a call re-triggering option, the method returns to block 606, and the interactive voice platform places another call to the subscriber device. Conversely, if the interactive voice platform has not received a signal indicating a selection of a call re-triggering option, the method can advance to decision 632.

Returning to block 610, when the interactive voice platform selects a live call delivery format, the method moves to block 620, and the interactive voice platform can send an introduction and advertisement to the subscriber device. Proceeding to block 622, the content of the audio message can be sent to the subscriber device. In a particular embodiment, the method can continue to decision node 624, and the interactive audio system can determine whether it has received a selection of an option to receive additional content, such as additional levels of detail with respect to hierarchical content or additional portions of non-hierarchical content. If a selection to receive additional content is received, the method returns to block 622, and the interactive voice platform sends the additional content to the subscriber device. On the other hand, if a selection to receive additional content is not received, the method advances to block 626, and the interactive voice system sends selectable options to the subscriber device.

For example, the options can include a selectable option to submit feedback via a website associated with the publisher of the content. At decision node 628, the interactive voice platform can determine whether it has received a selection of such an option. If so, the method moves to block 630, and the interactive voice platform can connect the subscriber device with the website of the publisher. The method then terminates at 640. Returning to decision node 632, if the interactive voice platform has not received a selection of an option to submit feedback, the method advances to decision node 632.

At decision node 632, the interactive voice platform determines whether it has received selections of other options, such as a live lead transfer option or a forwarding option. If the interactive voice platform determines that it has received a selection of another option, the method can move to block 634, and the interactive voice platform can execute the option. For example, the interactive voice platform can connect the call with a customer service representative or place a call having a substantially identical audio message to another subscriber or contact of the subscriber.

Conversely, if the interactive voice platform determines that it has not received a selection of any other option, the method proceeds to decision node 636, and the interactive voice platform determines whether it has received a selection of an opt-out command. If the interactive voice platform determines that it has received a selection of an opt-out command, the method continues to block 638, and the interactive voice platform can remove a subscriber account at the interactive voice platform, such that the subscriber receives no further calls. Alternatively, the interactive voice platform can send an instruction to the provider of the content provided with the call to remove an account related to the subscriber, such that the subscriber receives no further calls having content of the particular publisher. The method terminates at 640.

Figure 7:
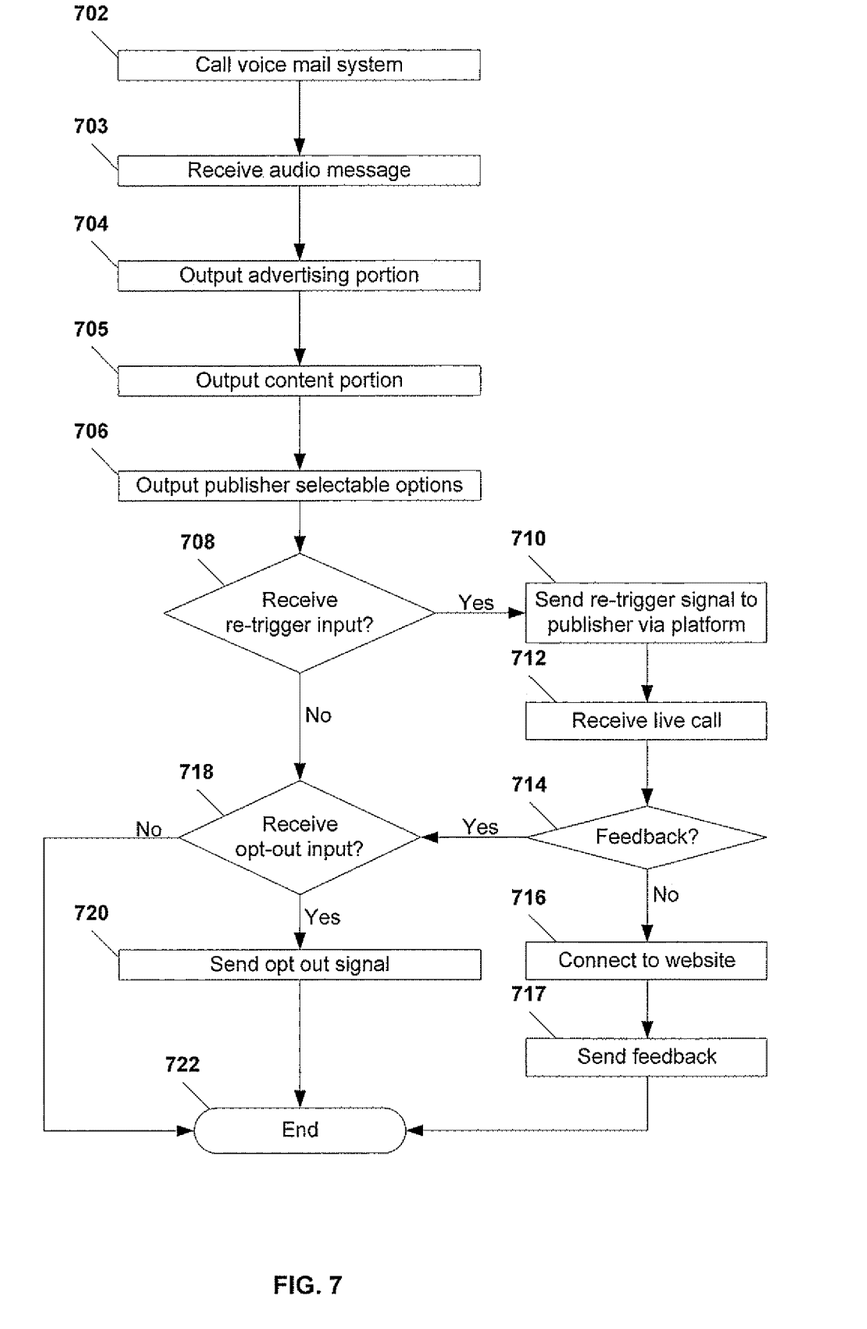
FIG. 7 is a flow diagram of a second particular embodiment of a method of delivering audio communications.

Referring to FIG. 7, a second particular embodiment of a method of delivering audio communications is illustrated. At block 702, a voice-enabled subscriber device calls a voice mail system after receiving inputs from a user to retrieve voice mail. Moving to block 703, the subscriber device receives an audio message recorded by an interactive voice system. The audio message includes an advertising portion and a content portion. Moving to block 704, the subscriber device outputs the advertising portion associated with the audio message. Proceeding to block 705, the subscriber device outputs the content portion associated with the audio message. Continuing to block 706, the subscriber device outputs publisher selectable options.

Advancing to decision node 708, the subscriber device determines whether it has received an input corresponding to a re-trigger option. If the subscriber device determines that it has not received such an input, the method can proceed to decision node 718. Whereas, if the subscriber device determines that it has received an input corresponding to a re-trigger option, the method moves to block 710, and the subscriber device sends a call re-triggering signal to the interactive voice platform. The call re-triggering signal can be a phone call, a text message, or other signal. Proceeding to block 712, the subscriber device receives a live call providing the audio message in a live call delivery format. The live call delivery format can include an option to submit feedback to the publisher via a website.

Continuing to decision node 714, the subscriber device determines whether it has received an input corresponding to an option to submit feedback. If the subscriber device determines that it has received such an input, the method advances to block 716, the subscriber device can connect with the publisher website via the interactive voice platform. Further, the subscriber device can send audio feedback to the publisher website, at block 717.

Returning to decision node 714, if the subscriber device determines that it has not received an input corresponding to an option to submit feedback, the method moves to decision node 718, and the subscriber device can determine whether it has received an input corresponding to an opt-out option. If the subscriber device determines that it has received an input corresponding to an opt-out option, the method continues to block 720, and the subscriber device sends a signal corresponding to the opt-out option to the interactive voice platform. The method terminates at 722.

Figure 8:
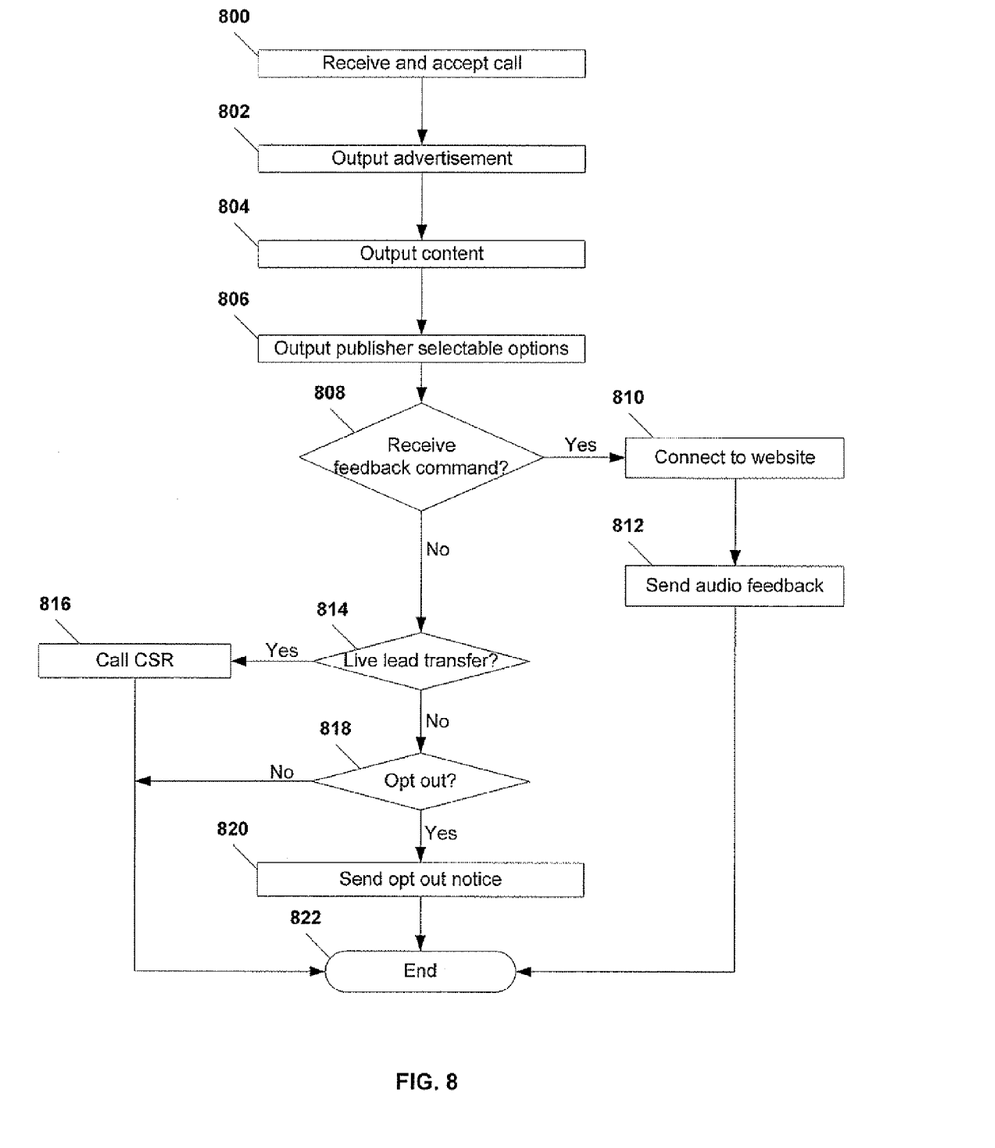
FIG. 8 is a flow diagram of a third particular embodiment of a method of delivering audio communications.

Referring to FIG. 8, a third particular embodiment of a method of delivering audio communications is illustrated. At block 800, a voice-enabled subscriber device receives and accepts a call from an interactive voice system. The call includes an audio message having an advertising portion and a content portion. Moving to block 802, the subscriber device outputs the advertising portion associated with the audio message. Proceeding to block 804, the subscriber device outputs the content portion associated with the audio message. Continuing to block 806, the subscriber device outputs publisher selectable options.

Advancing to decision node 808, the subscriber device determines whether it has received an input corresponding to an option to submit feedback. If the subscriber device determines that it has received such an input, the method advances to block 810, the subscriber device can connect with the publisher website via the interactive voice platform. Further, the subscriber device can send audio feedback to the publisher website, at block 812. The method can then terminate at 822.

Returning to decision node 808, if the subscriber device determines that it has not received an input corresponding to an option to submit feedback, the method moves to decision node 814, and the subscriber device can determine whether it has received an input corresponding to a live lead transfer option. If the subscriber device determines that it has received an input corresponding to a live lead transfer option, the method continues to block 816, and the subscriber device can call or otherwise be connected with a customer service representative of the publisher or an advertiser. The method can then terminate at 822.

Returning to decision node 814, if the subscriber device determines that it has not received an input corresponding to a live lead transfer option, the method can proceed to decision node 818, and the subscriber device can determine whether it has received an input corresponding to an opt-out option. If the subscriber device determines that it has received an input corresponding to an opt-out option, the method continues to block 820, and the subscriber device sends a signal corresponding to the opt-out option to the interactive voice platform. The method terminates at 822.

Figure 9:
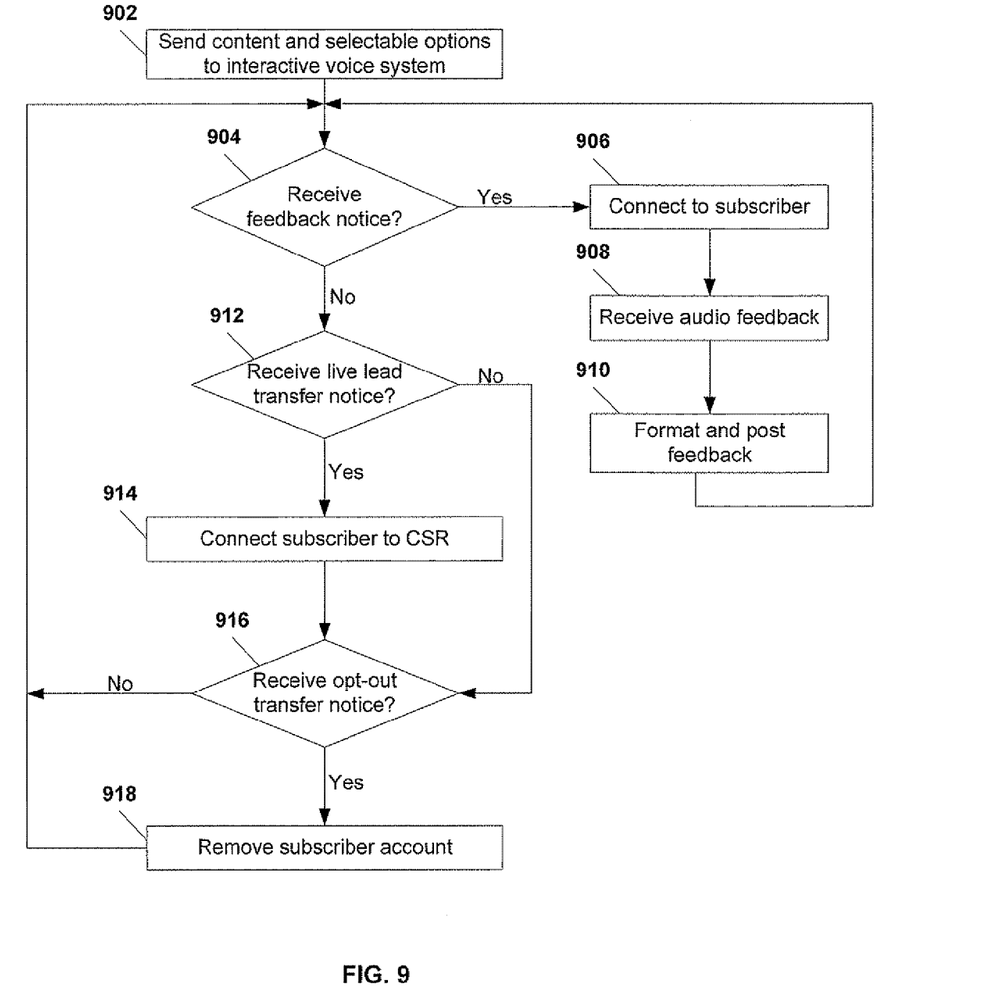
FIG. 9 is a flow diagram of a fourth particular embodiment of a method of delivering audio communications.

Referring to FIG. 9, a fourth particular embodiment of a method of delivering audio communications is illustrated. At block 902, a content publisher system sends content and selectable options to an interactive voice system via a portal that may include one or more application programming interfaces. Moving to decision node 904, the content publisher system can determine whether it has received data indicating that the interactive voice system has received a signal indicating that a subscriber device is going to send feedback to the content publisher system.

If the content publisher system determines that it has received such data, the method moves to block 906, and the content publisher system connects to the subscriber device. Proceeding to block 908, the content publisher system receives audio feedback from the subscriber device. Continuing to block 910, the content publisher system can format and post the feedback at a website. For instance, the content publisher system can convert speech associated with the audio feedback to text and post the text at the website. Alternatively, the content publisher system can record audio feedback to an audio file and post the selectable audio file at the website. Further, the content publisher system can stream the audio feedback in near real time to the website.

Returning to decision node 904, if the content publisher system determines that it has not received data indicating that a subscriber device is going to send feedback to the content publisher system, the method advances to decision node 912, and the content publisher system determines whether it has received data from the interactive voice system indicating that a live lead transfer option has been selected at a subscriber device. If such data is not received, the method then proceeds to decision node 916. Whereas, if such data is received, the method moves to block 914, and the content publisher system connects the subscriber device to a customer service representative.

Continuing to decision node 916, the content publisher system determines whether it has received data from the interactive voice system indicating that an opt-out option has been selected at a subscriber device. If the content publisher system determines that it has received data from the interactive voice system indicating that an opt-out option has been selected at a subscriber device, the method advances to block 918, and the content publisher system can remove an account associated with the subscriber. The method can then return to decision node 904 and continue.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
selectively delivering an audio message including a content portion and an advertising portion to a voice communication device based on a determination of whether a call placed to the voice communication device has been routed to a voice mail system associated with the voice communication device, wherein the audio message is delivered to the voice communication device via a computer in a first available delivery format when the determination indicates that the call was not routed to the voice mail system and the audio message is delivered in a second available delivery format when the determination indicates that the call has been routed to the voice mail system, wherein the advertising portion includes a primary advertisement when the audio message is delivered in the first available delivery format, and wherein the advertising portion includes a non-interactive advertisement that is different from the primary advertisement when the audio message is delivered in the second available delivery format.

2. The method of claim 1, wherein the audio message includes control information corresponding to interactive options.

3. The method of claim 2, wherein the interactive options include a re-trigger call option selectable to receive a live call having the audio message, a live lead transfer option selectable to connect with a customer service representative of a publisher or advertiser, a feedback option selectable to interact with a website related to a content publisher, a forwarding option selectable to cause a second call having a substantially identical audio message to be placed to a contact of a subscriber receiving the call, an opt-out option selectable to not receive future calls, an opt-out option selectable to not receive future content from the content publisher, or any combination thereof.

4. The method of claim 1, wherein the audio message includes a call branding portion, a greeting, or a combination thereof.

5. The method of claim 1, wherein the audio message includes a sponsor indication.

6. A method of delivering an audio communication, the method comprising:
placing a call to a mobile telephone device of a subscriber via a computer;
detecting that the call has been routed to a voice mail system; and
in response to detecting that the call has been routed to the voice mail system, delivering an audio message having an advertising portion and a content portion in a voice mail delivery format selected from a plurality of formats for delivering the audio message via the call, the plurality of formats including a live delivery format and the voice mail delivery format, wherein the advertising portion includes a non-interactive advertisement when the audio message is delivered in the voice mail delivery format, and wherein the non-interactive advertisement is different from a primary advertisement included in the advertising portion when the audio message is delivered in the live delivery format.

7. The method of claim 6, wherein the voice mail delivery format includes a plurality of post-receipt interactive options.

8. The method of claim 6, wherein the content portion includes at least one of financial information, e-commerce information, government information, auction information, social network information, news information, web log information, entertainment information, personal communications, account status, messaging information, or any combination thereof.

9. The method of claim 6, wherein the audio message includes opt-out instructions comprising tasks that can be performed to not receive future calls related to a publisher of the content portion.

10. A method of receiving an audio communication, the method comprising:

receiving an audio message at a mobile telephone device, the audio message having an advertising portion and a content portion, wherein the audio message is delivered to the mobile telephone device via a computer, wherein the audio message is received via a delivery format selected from a plurality of formats for delivering the audio message based on whether the audio message is routed to a voice mail system associated with the mobile telephone device, the plurality of formats including a live delivery format and a voice mail delivery format, wherein, when the audio message is not routed to the voice mail system, the advertising portion includes a primary advertisement that is received in the live delivery format, and wherein, when the audio message is routed to the voice mail system, the advertising portion includes a non-interactive advertisement that is different from the primary advertisement that is received in the voice mail delivery format.

11. The method of claim 10, wherein the audio message includes a call branding portion, a greeting, or a combination thereof.

12. The method of claim 10, wherein the audio message includes a sponsor indication.

13. The method of claim 10, wherein the audio message includes a plurality of interactive options when the audio message is received via the voice mail delivery format.

14. The method of claim 10, wherein the audio message includes a live lead transfer option when the audio message is received via the live delivery format.

15. The method of claim 10, wherein the advertising portion is played before the content portion is played.

16. The method of claim 15, wherein the audio message includes a second advertising portion.

17. The method of claim 10, wherein the audio message may be forwarded to another person by the user.

18. The method of claim 10, wherein the content portion includes at least one of financial information, e-commerce information, government information, auction information, social network information, news information, web log information, entertainment information, personal communications, account status, messaging information, or any combination thereof.

19. A method of allocating advertising capacity between a first party and a second party, the method comprising:

identifying, via a computer, advertising capacity for advertisements that are insertable into at least one audio message to be selectively delivered over a voice based communication medium to an end user wherein, when a determination indicates that an audio message has not been routed to the voice mail system, a primary advertisement is inserted into the audio message and is delivered in a live delivery format, and wherein, when the determination indicates that the audio message has been routed to the voice mail system, a non-interactive advertisement that is different from the primary advertisement is inserted into the audio message and is delivered in a voice mail delivery format;

allocating a first portion of the advertising capacity to a first party; and allocating a second portion of the advertising capacity to a second party.

20. The method of claim 19, wherein the first party is a content provider of audio content.

21. The method of claim 19, wherein the first party is a content provider and wherein the content provider provides content that is convertible to audio message content.

22. The method of claim 19, wherein the second party is a service provider.

23. The method of claim 19, wherein the second party is a voice publishing network provider.

24. The method of claim 19, wherein the allocation of the advertising capacity varies based on call volume.

25. The method of claim 19, further comprising selling advertising capacity allocated to at least one of the first and second party to a third party.

26. The method of claim 19, wherein a monthly call volume determines the allocation of the advertising capacity between the first and the second party.

27. The method of claim 19, wherein the first party is a content provider and wherein one or more voice calls are placed for the content provider at a subsidized cost.

28. The method of claim 27, wherein the subsidized cost is zero.

29. The method of claim 19, wherein the first party acquires advertising capacity from the second party.

30. The method of claim 19, wherein the first portion is equal to the second portion.

31. The method of claim 19, wherein the audio message includes at least one of financial content, e-commerce content, government content, auction content, social network content, news content, web log content, entertainment content, personal communications, account status, messaging information, or any combination thereof.

32. A method of advertising, the method comprising:

acquiring advertising capacity to place audio messages to at least one user via a voice communication channel, the voice communication channel to selectively communicate a particular audio message that includes non-advertising content and advertising content based on a determination of whether the particular audio message is routed to a voice mail system associated with the voice communication channel; and distributing the particular audio message, via a computer, over the voice communication channel based on the acquired advertising capacity, wherein, when the determination indicates that the particular audio message has not been routed to the voice mail system, the particular audio message includes a primary advertisement and is delivered in a live delivery format, and wherein, when the determination indicates that the particular audio message has been routed to the voice mail system, the particular audio message includes a non-interactive advertisement that is different from the primary advertisement and is delivered in a voice mail delivery format.

33. The method of claim 32, wherein the advertising capacity is acquired from a service provider having access to voice over internet protocol (VoIP) call placement capacity.

34. The method of claim 32, wherein the advertising capacity is acquired from a content provider.

35. The method of claim 34, wherein the content provider is compensated for providing the advertising capacity.

36. An Internet portal system comprising:

at least one server to store Internet site data;

a user interface to allow a user having a remote internet connection to provide search queries and to retrieve search results, the search results including content from at least one web site; and an advertising module to provide advertising via the user interface;

wherein the advertising module has an interface to a voice delivery platform, the voice delivery platform to provide for selective delivery of audio messages via a voice communication medium to end users based on a determination of whether the audio messages are routed to a voice mail system that is associated with the voice communication medium, at least one of the audio messages including a content portion and an advertising portion, wherein, when the determination indicates that the at least one audio message has not been routed to the voice mail system, the advertising portion includes a primary advertisement and is delivered in a live delivery format, and wherein, when the determination indicates that the at least one audio message has been routed to the voice mail system, the advertising portion includes a non-interactive advertisement that is different from the primary advertisement and is delivered in a voice mail delivery format.

37. The system of claim 36, wherein the advertising portion is inserted into the at least one audio message prior to delivery.

38. The system of claim 36, wherein the at least one audio message is delivered to a mobile communications device and wherein the mobile communications device provides feedback content that may be accessed at the server.

39. An Internet portal system comprising:
  at least one server to store Internet site data;
  a user interface to allow a user having a remote Internet connection to retrieve content including the Internet site data; and
  an interface to a voice delivery platform, the voice delivery platform to provide for selective delivery of audio messages via a voice communication medium to end users based on a determination of whether the audio messages are routed to a voice mail system that is associated with the voice communication medium, at least one of the audio messages including a content portion and an advertising portion, wherein, when the determination indicates that the at least one audio message has not been routed to the voice mail system, the advertising portion includes a primary advertisement and is delivered in a live delivery format, and wherein, when the determination indicates that the at least one audio message has been routed to the voice mail system, the advertising portion includes a non-interactive advertisement that is different from the primary advertisement and is delivered in a voice mail delivery format.

40. The system of claim 39, wherein the advertising portion is inserted into the at least one audio message prior to delivery.

41. The system of claim 39, wherein the at least one audio message is delivered to a mobile communications device and wherein the mobile communications device provides feedback content that may be accessed at the at least one server.

42. The system of claim 41, wherein the mobile communications device is a wireless phone.

43. The system of claim 39, wherein the interne site data includes at least one of financial information, e-commerce information, government information, auction information, social network information, news information, web log information, entertainment information, personal communications, account status, messaging information, or any combination thereof.

44. The system of claim 39, wherein the at least one audio message is delivered via an instant message in real-time or in near real-time when the at least one audio message is delivered in the live delivery format.

* * * * *